W. A. MOODY.
CULTIVATOR.

No. 68,525.

Patented Sept. 3, 1867.

Witnesses.
Theo Fusche
Wm Truern

Inventor
W A Moody
Per Munn & Co
Attys

United States Patent Office.

W. A. MOODY, OF MONTEZUMA, IOWA.

Letters Patent No. 68,525, dated September 3, 1867.

---

IMPROVEMENT IN CULTIVATORS.

---

The Schedule referred to in these Letters Patent and making part of the same.

---

TO ALL WHOM IT MAY CONCERN:

Be it known that I, W. A. MOODY, of Montezuma, in the county of Poweshiek, and State of Iowa, have invented a new and improved Cultivator, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved cultivator, of that class in which the shovels or ploughs are allowed a lateral as well as a rising and falling movement. The invention consists in an improved manner of applying the plough-beams to the frame of the machine, whereby the same may be moved or adjusted with facility and be under the complete control of the driver or operator. The invention also relates to a new and improved application of the double-tree to the machine, whereby the same may be balanced in order to relieve the necks of the draught animals of any undue weight. In the accompanying sheet of drawings—

Figure 1:
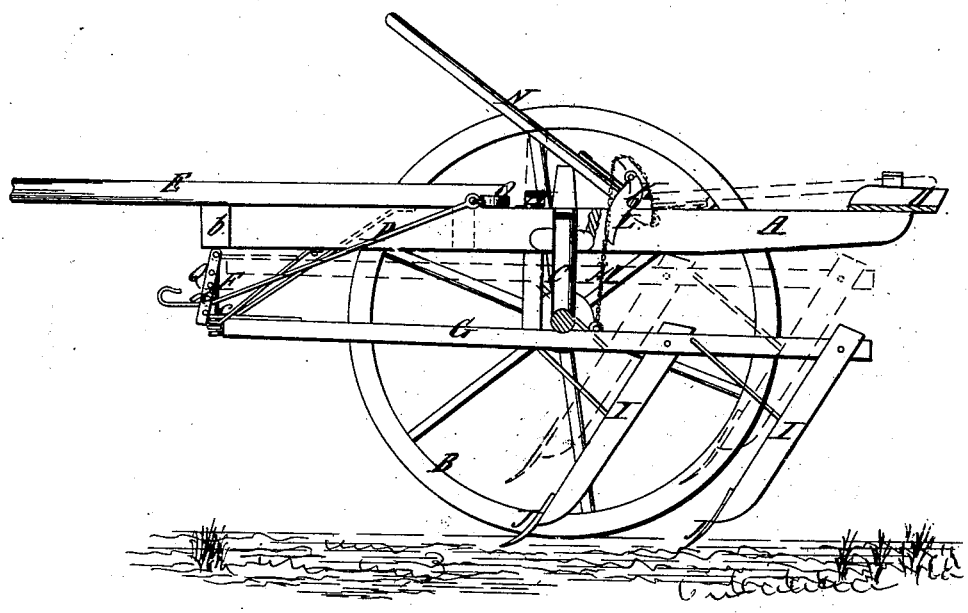
Figure 2:
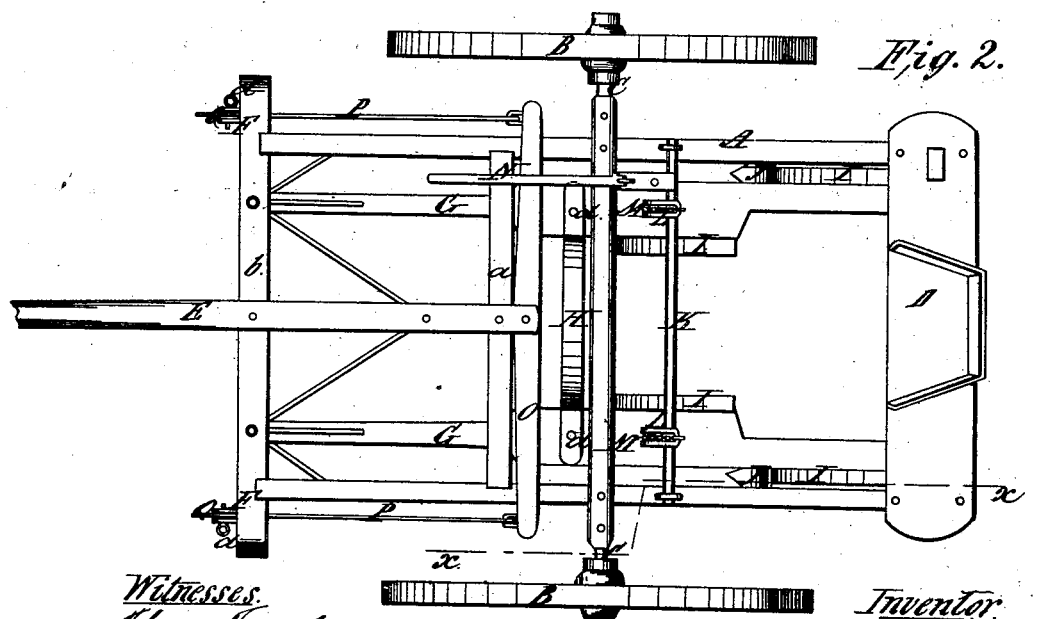

Figure 1 is a side sectional view of my invention, taken in the line $x\ x$, fig. 2.

Figure 2, a plan or top view of the same.

Similar letters of reference indicate like parts.

A represents the main frame of the machine, which is of rectangular form, and mounted on two wheels, B B, the axles C of the latter extending down from the sides of the frame A, so that it may have a sufficiently elevated position. On the rear of the frame A the driver's seat D is placed, and the draught-pole E extends back on the frame A, and is secured at its inner end to a cross-bar, $a$, of the frame just in front of the axles C C. To the front cross-bar $b$ of the frame A there are attached two pendent-rods F F, on which the front ends of the plough-beams G G work, said beams being provided with an eye, $e$, at their front ends, and these eyes are fitted on the rods F and allowed to slide freely up and down thereon. The plough-beams G G are connected about at their centres by a bow-shaped rod or bar, H, the beams being each attached to the same by a single bolt or rivet, $d$, as shown in fig. 2. Each beam G has two standards, I I, attached to it, and these standards have the usual or any proper shovels or ploughs, J, on their lower ends. On the frame A, just back of the axles of the wheels, there is placed a transverse shaft, K, having two eccentrics L L upon it, to which chains M are attached, said chains being connected to the plough-beams G G, as shown clearly in fig. 1. From the above description it will be seen that the plough-beams may be moved laterally with the greatest facility in order to conform to the curvature of the rows of plants, and the plough-beams raised and lowered by simply manipulating a lever, N, attached to the shaft K. The beams, it will be seen, are raised bodily in consequence of the eyes $e$ being allowed to slide on the pendent-rods F F, and the beams, when fully raised, admit of the shovels or ploughs clearing the ground entirely, so that the machine may be drawn from place to place without any difficulty whatever. O is the double-tree, which is pivoted to the rear end of the draught-pole E, and has a rod, P, attached to each end of it. These rods P pass through stirrups, Q, which are pivoted to the ends of the front cross-bar $b$ of the main frame A, the rods P being curved or bent so as to form an eye in each, through which a pin, $d$, passes, said pins also passing through the stirrups Q. Each stirrup has a series of holes made through it, one above the other, through any of which the pins $d$ may pass in order to admit of the rods P being adjusted higher or lower in the stirrups, as may be desired, the draught animals being attached. By this arrangement the line of draught may be regulated as desired, and the machine kept in a perfectly balanced state, and the necks of the animals relieved of all undue weight.

Having thus described my invention, I claim as new, and desire to secure by Letters Patent—

The fitting of the front ends of the plough-beams G G on pendent-rods F, and connecting the beams by chains M to eccentrics L on a shaft, K, the beams being connected by a bow-shaped rod or bar, H, all arranged to operate in the manner substantially as and for the purpose set forth.

W. A. MOODY.

Witnesses:
  WILLIAM MOODY, Sr.,
  S. J. DALBEY.